United States Patent
Cecchi et al.

(10) Patent No.: US 9,382,052 B2
(45) Date of Patent: Jul. 5, 2016

(54) AUTOGRAPHABLE FLAT OBJECTS WHICH ARE PORTABLE AND ABLE TO BE READILY CARRIED AND DISPLAYED

(71) Applicants: Lauren Cecchi, Madison, CT (US);
Paige Cecchi, Madison, CT (US);
Michael R. Cecchi, Madison, CT (US);
Michael D. Cecchi, Madison, CT (US)

(72) Inventors: Lauren Cecchi, Madison, CT (US);
Paige Cecchi, Madison, CT (US);
Michael R. Cecchi, Madison, CT (US);
Michael D. Cecchi, Madison, CT (US)

( * ) Notice: Subject to any disclaimer, the term of this patent is extended or adjusted under 35 U.S.C. 154(b) by 0 days.

(21) Appl. No.: 14/080,481

(22) Filed: Nov. 14, 2013

(65) Prior Publication Data

US 2014/0143033 A1 May 22, 2014

Related U.S. Application Data

(60) Provisional application No. 61/796,696, filed on Nov. 19, 2012.

(51) Int. Cl.
*G09F 11/00* (2006.01)
*B65D 75/36* (2006.01)
*G06Q 30/02* (2012.01)
*A47F 3/00* (2006.01)

(52) U.S. Cl.
CPC . *B65D 75/36* (2013.01); *A47F 3/00* (2013.01); *G06Q 30/0241* (2013.01); *Y10T 428/216* (2015.01)

(58) Field of Classification Search
CPC ............................. A47F 3/00; Y10T 428/216
See application file for complete search history.

(56) References Cited

U.S. PATENT DOCUMENTS

| | | | |
|---|---|---|---|
| 4,063,639 A * | 12/1977 | Grant | 206/0.82 |
| 6,176,614 B1 | 1/2001 | Taylor | |
| D489,289 S | 5/2004 | Porter | |
| 6,973,747 B2 | 12/2005 | Ratmansky et al. | |
| 7,437,840 B2 | 10/2008 | Ratmansky et al. | |
| 7,445,118 B2 * | 11/2008 | Schroeder | 206/579 |
| 7,493,634 B1 | 2/2009 | Daley | |
| 2003/0144094 A1 * | 7/2003 | Picciolini | 473/569 |
| 2004/0007870 A1 | 1/2004 | Ueno | |
| 2009/0019738 A1 | 1/2009 | Cunningham | |
| 2010/0139132 A1 * | 6/2010 | Kasten | 40/6 |
| 2010/0213087 A1 * | 8/2010 | Weldon | 206/315.9 |
| 2011/0030253 A1 * | 2/2011 | Fahey | 40/584 |
| 2012/0233896 A1 | 9/2012 | Johnson | |

FOREIGN PATENT DOCUMENTS

FR 2 947 758 A1 1/2011

* cited by examiner

*Primary Examiner* — Kristina Junge
(74) *Attorney, Agent, or Firm* — Merchant & Gould P.C.

(57) ABSTRACT

A series of memorabilia pieces have markable areas for recording an autograph or signature and an information area for recording information about the autograph or signature (e.g., the person who signed it, the time, the place and other information). The pieces are readily autographed, signed, registered, collected, and displayed. The pieces can have many shapes and sizes and can include images related to a sport, profession, or pastime of collectability. For example, the pieces relate to a section of a collectable population, such as sports, music, acting, politics, auto racing and more. The pieces may be serialized to allow recording and identification. The items may be registered in a central recording archive.

10 Claims, 15 Drawing Sheets

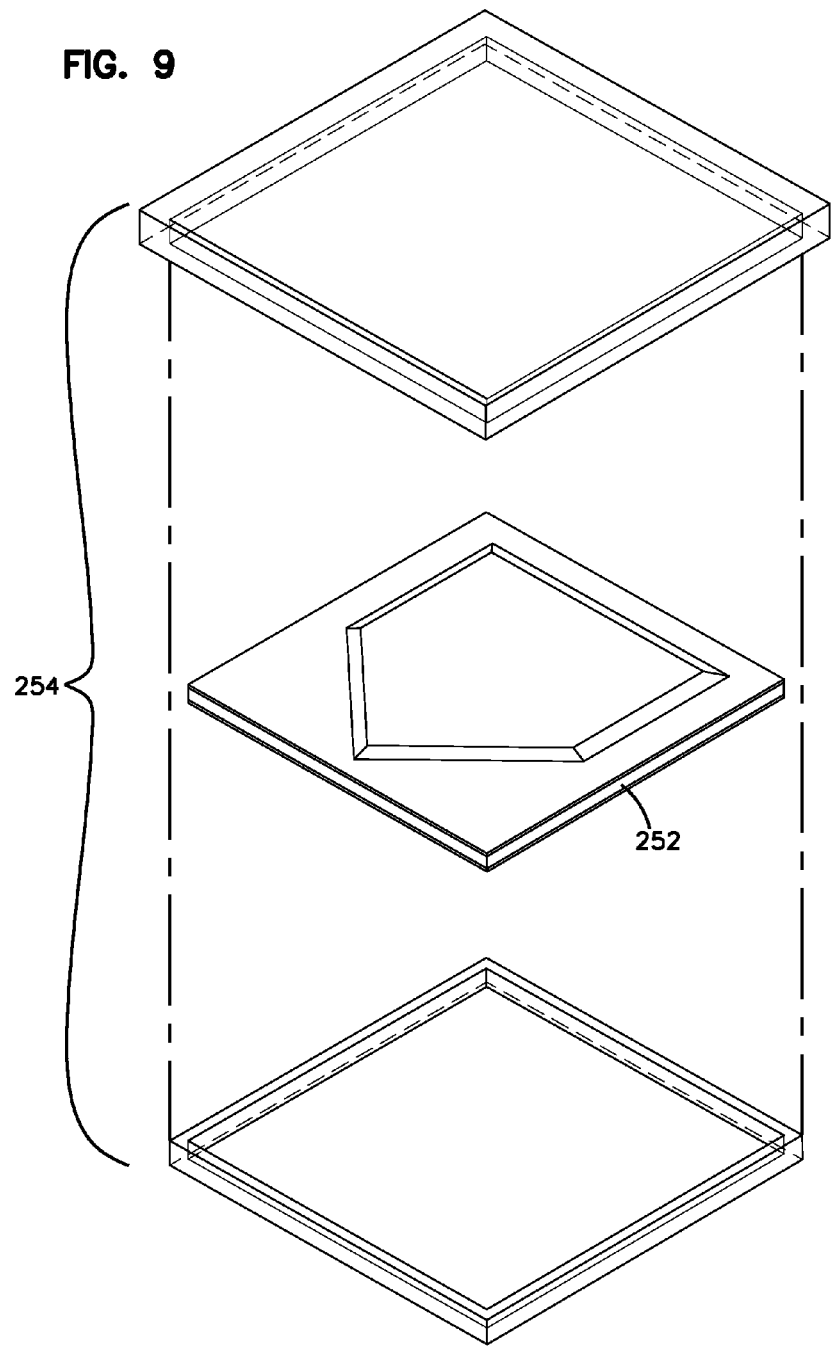

AUTOGRAPHABLE FLAT OBJECTS WHICH ARE PORTABLE AND ABLE TO BE READILY CARRIED AND DISPLAYED

CROSS-REFERENCE TO RELATED APPLICATION

The present application claims the benefit of U.S. Provisional Patent Application Ser. No. 61/796,696, filed Nov. 19, 2012, which application is hereby incorporated by reference in its entirety.

BACKGROUND

When it comes to collecting autographs of well-known celebrities, personalities, and people, collectors have the tendency to use actual sports items used by the person. Sports items such as baseballs are used for baseball players, footballs for football players, sports uniform jerseys for athletes, and the like. The problem encountered by this practice is the fact that the items may be cumbersome, or the person may not have one readily available to be autographed. One example would be having a basketball available for a basketball player to autograph. Individuals may use items such as napkins, scrap pieces of paper, menus or other random items to get autographs. After these items are signed, the majority of them end up being damaged, discarded or put away in a place they cannot be readily displayed and appreciated.

Additional problems faced by people seeking autographs of famous or notable individuals is that they try to have items related to the individual, such as a baseball card with the player's image on it, a picture of the person, or an item related to the signatory, such as a program.

The overall problem faced by individuals who are able to obtain autographs, on random items, is their items are diminished in their collectable values compared to what they might be able to get for autographed sports items for athletes. The item signed can also possibly be easily misplaced, or lost, and not be retained by the collector.

SUMMARY

One aspect of the present disclosure relates to providing a series of autographable pieces or items for obtaining autographs from well-known individuals, which pieces or items are readily available, durable, easily autographed, and easily displayed, if so desired. In certain examples, the autographed items can be readily registered for future reference and authenticity.

This invention relates to pieces, which may be autographed by an individual. The pieces allow a person to obtain the autographs of well-known, famous or notable people with the ability to retain the autographed piece, and be able to display it. The terms "plaquette," "piece," "item," and "collectable memorabilia" may be used interchangeably in this disclosure to describe the autographable subject matter of this invention.

The plaquettes of this invention will allow an individual to obtain the autograph and to record certain pertinent information on the plaquette, such as the name of the signer, the place where it was signed, the date it was signed, and the like.

The plaquettes will then allow the individual to record this information into a database, be able to record an image of the person signing the item, within a gallery or archive on a website or such.

The plaquettes will be made of an easily manufactured material, such as a copolymer, paper, cardboard or other such material which will be conducive to signing of an autograph and will be relatively rigid and durable. The plaquettes or pieces may in certain instances be of selected surface textures and materials, so as to emulate the object they represent. Examples of this would be the surface texture of the object to be signed, such as the surface texture and dimples of a basketball; the white leather look and stitching of a baseball; the rubber material of a hockey puck; and the like.

The plaquettes may take specific shapes, such as include baseball shaped, football shaped, basketball shaped, and images of a profession, or walk of life, such as: a musical note relating to a musical performer; a star for TV and movie personalities; a donkey or elephant for political individuals; and other pieces relating to particular themes. The items can be accessible through a website which will allow the items to be sold, traded, or bartered.

The items will be easy to carry and transport, and it may be flat or nearly flat, and should be able to be held in pants pockets, pocketbooks, backpacks, purses, car glove boxes and the like. They can be essentially hand-sized.

The pieces may include multiple shapes and sizes. The pieces may be a shape and image combination to achieve the desired effect. An example of such a combination is a roundly shaped piece, representing a baseball, basketball, and the like with an image of respective ball; or a square piece with an image on it, such as a musical note, to be signed by a person related to music.

The pieces may include the shapes, images, and sizes of a baseball, football, soccer ball, tennis ball, racecar, wheels, stars, squares and ovals. The pieces may be the actual size of the imitated items, such as a baseball or football, but may also be miniature sizes as in the case of a basketball, or larger sizes as in the case of a golf ball. The various sizes will allow diversified use of the piece. An example of this is a baseball home plate, which may be in its actual size of seventeen inches across the top, or four inches across the top in a smaller size; or a basketball of twelve inches in diameter or of a smaller size of three to six inches. The desirable size of the smaller pieces is about three inches in cross-dimension (e.g., diameter), a size that will easily fit in the palm of someone's hand, or in a handbag or pocket.

As noted previously, the pieces will include a comprehensive coverage of signable images of, for example, a soccer ball, a baseball, a football, a basketball, a music note, a star, a donkey, an elephant, a hockey puck, a volleyball, a cricket ball, a cricket bat, a tennis ball, a tennis racket, a table tennis ball, a badminton fly, boxing gloves, boxing shorts, a racecar, a racecar tire, a bowling ball, etc.

The invention may include a clear plastic container in which the signable piece can be held. The clear plastic container may copy the specific shape of the individual piece. An example of this is a round shape for a baseball piece; an oblong shape for a football piece; a square or rectangle shape for oddly shaped or square pieces; or one shape to hold all the pieces, which may give them uniformity. The pieces may be generally the same overall length and height to make the cases universal in production and use. The benefits of the plastic containers is to hold the pieces before they are signed to keep them clean and intact and, after being autographed, to keep the pieces clean and to allow the pieces to be displayed.

The clear plastic containers may be made of a copolymer, Lexan, or polycarbonate, and may contain a UV protectorate within to protect the piece from fading over time. The container device of the invention may be rigid or flexible. The container device may be a two-part device, which will join together, holding the piece within the container, with a twist-on fit, a pressure fit, or a screw-on fit to keep the parts together.

The parts may have ridges, raised edges, raised areas, or cutouts to allow them to be assembled and disassembled.

In an additional embodiment of the container, it can be made as a single piece. A clear piece, with two exterior walls, a hollow interior, and an opening in its edge, so that the piece can be slipped into the interior of the container, thereby protecting the piece from damage.

The invention may include transparent holding cases for protection and display of the pieces, such as displaying the pieces on bookcase shelves, on desks, or on walls. The displaying cases may be individually mounted on the wall through nails, hooks, tape, or other mounting means.

A major advantage of the invention is the ease in having the autographable piece in your possession when the time is right for getting the desired autograph. Additional advantages include the durability and cleanliness created by the holding display case and the wide range of personalities which may sign the various signature pieces which are not limited to sports personalities. The pieces may also be signed by persons, such as friends, relatives and more.

In accordance with this invention a user will have in the user's procession at least one of the autograph pieces, and the user will take the piece out of the case, have the piece signed by the desired individual, then write on the front or the back of the piece any information that the user so desires, generally the individual's name, where the piece was signed, the date the piece was signed, and possibly a picture of the individual signing the piece. The user may obtain multiple signatures on the same item. The user would then return the piece to its carrying case and then be able to show, display, and keep the piece. The item may then be registered on an appropriate website and/or shown on the website, which also may allow the pieces to be traded, bought, and/or sold.

It is an object of this invention is to provide an item or piece, which can be autographed by a sports star, celebrity, or other individual, and then displayed in a transparent protective casing.

It is a further object of this invention to provide an item or piece that can be autographed and can include, for example, information related to the individual who signed the item, where it was signed, and when it was signed.

It is a further object of this invention is to provide an item or piece that can be autographed and then filed in an archive, which will document its authenticity.

It is another object of this invention to provide a collection of varied images, shapes and sizes of pieces that can be autographed and preserved in individual transparent closed display and storage cases.

The invention will be a series of autographable items or pieces, which are able to be readily carried and portable. The pieces may be in shapes indicative of the sport, such as a baseball or football or many other professions or careers. After the piece is autographed, the user may record on the item the signing individual, the date, and the place where the piece was signed to help establish a point-in-time for the piece and begin to establish its history.

The user may register the signed item into a database of similar items. The items may be consecutively numbered, established in smaller series of several numbered sequences, and/or may be assigned a number when registered. Certain system will allow the user to register a picture of the individual at the moment they are autographing the item, and then to enter this picture into a gallery. The pieces can be displayed on a wall, shelf, or table.

In an embodiment of the invention, the piece may contain a small hole through which a string or other attachment device can be inserted for use in attaching the piece to an autographed item. An example of this would be to attach a string to the piece and to loop the string around a button on a baseball jersey, which may contain an autograph.

One aspect of the present disclosure relates to a collectable item for acquiring and displaying an autograph. The collectable item includes a plaquette defining a minor thickness that extends between a major front side and an opposite major back side. The plaquette has a round planform. The front surface is suitable for receiving an autograph. The major back side includes a rear surface defining an area for recording autograph information.

In an example, the major front side of the plaquette includes a front surface having a texture that emulates baseball leather. The major front side also has raised baseball stitches that feel like baseball stitches to the touch.

In certain examples, the minor thickness is greater than $1/16^{th}$ inch. In other examples, the minor thickness is greater than $1/8^{th}$ inch. In certain examples, the minor thickness is in the range of $1/8^{th}$ to $3/8^{th}$ inch or in the range of $1/8^{th}$ to $1/4$ inch.

In certain examples, the plaquette has a diameter in the range of 2 to 8 inches or in the range of 2 to 6 inches, or in the range of 2 to 4 inches. In certain examples, the major front side defines an area less than 144 square inches or less than 64 square inches, or less than 36 square inches or less than 16 square inches or less than 9 square inches. In certain examples, the major front side defines an area in the range of 4 square inches to 64 square inches, or in the range of 4 square inches to 16 square inches, or in the range of 4 square inches to 9 square inches. In certain examples, the plaquette is pocket-sized.

In certain examples, the rear surface defined by the major back side includes at least one line for recording autograph information. In certain examples, the rear surface includes multiple parallel lines for recording the autograph information.

In certain examples, the collectable item also can include a plastic display case for receiving and protecting the plaquette. The display case can be flat, rigid, and transparent. In certain examples, the display case can have a round planform that conforms to the round planform of the plaquette. In certain examples, the plastic display case includes mating front and back pieces between which the plaquette is received. In certain examples, the plastic display case can include an ultraviolet radiation inhibitor. In certain examples, the plastic display case is pocket-sized. In certain examples, the plastic display case has a construction that is more rigid than the plaquette. In certain examples, the plaquette is nonpliant.

Another aspect of the present disclosure relates to a collectable item for acquiring and displaying an autograph. The collectable item includes a plaquette defining a minor thickness that extends between a major front side and an opposite major back side. The plaquette has a planform that resembles a sports ball. The major front side of the plaquette includes a front surface suitable for receiving an autograph. The front surface has a texture that emulates a look and feel of the sports ball. In certain examples, the texture of the front surface of the major front side of the plaquette emulates leather, and raised stitches are provided at the major front side of the plaquette.

In certain examples, the sports ball is a baseball, the planform of the plaquette is round, the texture of the front surface emulates baseball leather and raised baseball stitches are provided at the major front side of the plaquette. In another example, the sports ball is a basketball, the planform of the plaquette is round, and the texture of the front surface emulates basketball leather and/or dimples. In a further example, the sports ball is a football, the planform of the plaquette is football-shaped, the texture of the front surface emulates football leather, and raised football laces are provided at the major front side of the plaquette. In a further example, the sports ball is a golf ball, the planform of the plaquette is round, and the texture of the front surface emulates golf ball dimples. In still a further example, the sports ball is a rugby ball, the planform of the plaquette is obround, the texture of the front surface emulates rugby ball leather, and rugby stitching can be provided at the front surface. In a further example, the sports ball is a soccer ball, the planform of the plaquette is round, the texture of the front surface emulates soccer ball leather, and soccer ball stitching is provided at the major front side of the plaquette.

In certain examples, the plaquette can be pocket-sized. In certain examples, the thickness of the plaquette can be greater than $1/16^{th}$ inch, or greater than $1/8^{th}$ inch, or in the range of $1/8^{th}$ inch to $3/8^{th}$ inch or in the range of $1/8^{th}$ inch to $1/4$ inch.

In certain examples, the major back side of the plaquette includes a rear surface defining an area for recording autograph information. The area can include one or more lines for recording the autograph information. In any of the examples disclosed herein, a back surface provided at the major back side of the plaquette can include a texture that emulates a look and feel of the sports ball.

In certain examples, the collectable item includes a plastic display case for receiving and protecting the plaquette. In certain examples, the display case is flat. In certain examples, the display case is rigid. In certain examples, the display case is transparent. In certain examples, the display case has a planform that conforms to the planform of the plaquette. In certain examples, the planform of the plastic display case is round. In certain examples, the planform of the display case is football-shaped. In certain examples, the plastic display case includes mating front and back pieces between which the plaquette is received. In certain examples, the plastic display case is pocket-sized.

A further aspect to the present disclosure relates to a collectable item for acquiring and displaying an autograph. The collectable item includes a pocket-sized plaquette defining a minor thickness that extends between a major front side and an opposite major back side. The plaquette has a characteristic that is indicative of an industry that includes celebrities. The major front side of the plaquette includes a front surface suitable for receiving an autograph thereon. The collectable item also includes a pocket-sized display case for receiving and protecting the plaquette. The display case can have a flat, rigid construction. In certain examples, the display case is more rigid than the plaquette. In certain examples, the display case is transparent. In certain examples, the display case has a shape that conforms to a shape of the plaquette. In certain examples, the plaquette and the display case are round. In certain examples, the display case is plastic and includes mating front and back pieces between which the plaquette is received. In certain examples, the industry is selected from the group consisting of sports, music, television, movies, and politics. In certain examples, the plaquette is nonpliant.

A further aspect of the present disclosure relates to a method for promoting the acquisition of autographs. The method includes the step of making available a line of pocket-sized plaquettes, each defining a minor thickness that extends between a major front side and an opposite major back side. The plaquettes have characteristics that are indicative of one or more industries that include celebrities. The front sides of the plaquettes include front surfaces suitable for receiving autographs thereon. The method also includes the step of marketing the plaquettes as autographable items. In certain examples, the line of plaquettes includes pocket-sized plaquettes that emulate a baseball, pocket-sized plaquettes that emulate a football, and pocket-sized plaquettes that emulate a basketball. In certain examples, the line of plaquettes includes pocket-sized plaquettes that emulate a hockey puck. In certain examples, the line of plaquettes includes pocket-sized plaquettes that emulate a golf ball. In certain examples, the line of plaquettes includes pocket-sized plaquettes that emulate a soccer ball. In certain examples, the line of plaquettes includes pocket-sized plaquettes that emulate a tennis ball. In certain examples, the line of plaquettes includes pocket-sized plaquettes that emulate a rugby ball. In certain examples, the plaquettes are each marketed in combination with rigid, pocket-sized plastic display cases for receiving the plaquettes. In certain examples, the display cases have shapes that can conform to the shapes of their corresponding plaquettes.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples discloses herein are based.

BRIEF DESCRIPTION OF THE DRAWINGS

The present disclosure will be better understood by those skilled in the art by referencing to the accompanying drawings, wherein like elements are numbered alike in the several figures, in which:

FIG. 9 is an exploded view showing the storage and display case of FIG. 8 in combination with a rectangular plaquette having characteristics indicative of a baseball home plate;

DETAILED DESCRIPTION

Figure 1:
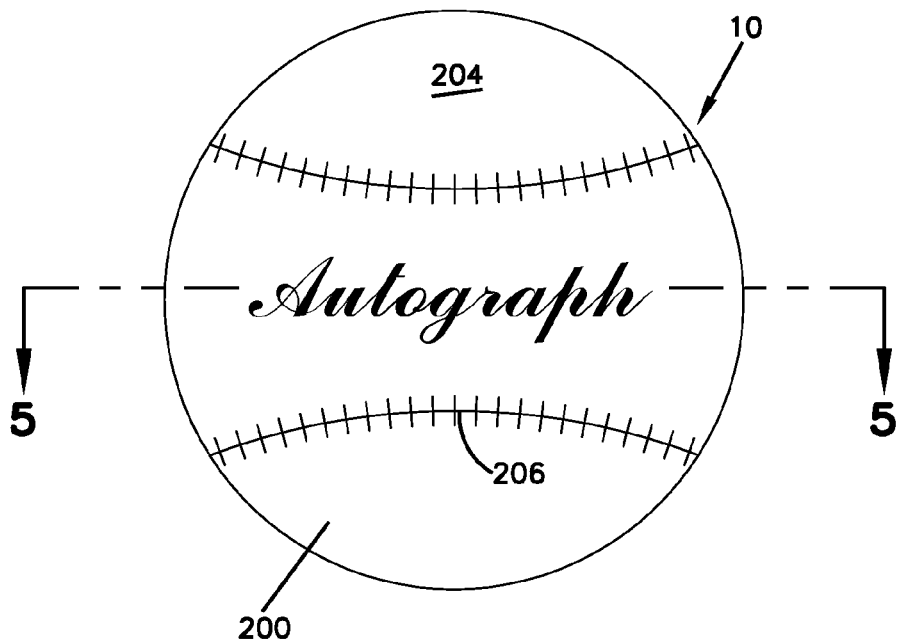
FIG. 1 is a front plan view of an autographable plaquette in accordance with the principles of the present disclosure, the plaquette being configured and shaped so as to mimic/emulate a major league baseball.
Figure 2:
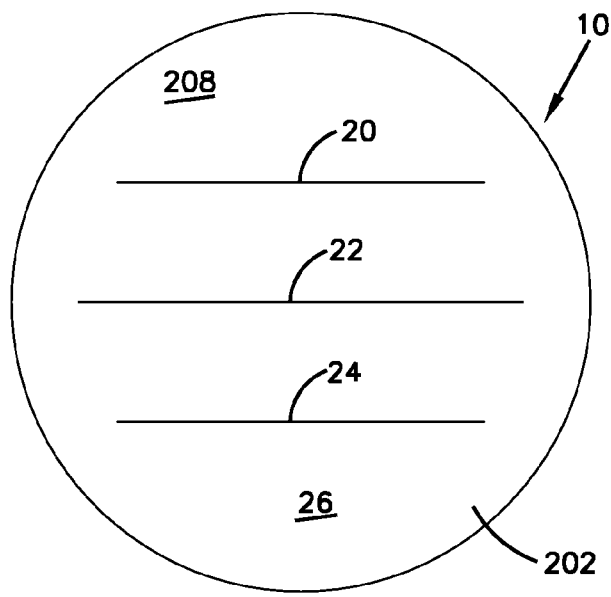
FIG. 2 is a back plan view of the plaquette of FIG. 1.

There is shown in FIGS. 1 and 2 an example of an autographable embodiment of a piece that is formed in accordance with this disclosure. The signature piece 10 includes a front surface made of an autographable material. In the example shown in FIGS. 1 and 2, the piece mimics a baseball, has the round shape of a baseball, and is about ⅛ to ¼ inch thick. The baseball piece 10 will contain baseball stitches, which may be a mere image of stitches or may have actual raised material that feels like baseball stitches to the touch. The front surface may include an imitation of the texture of a baseball and may have the feel of a baseball to the touch.

FIG. 2 shows the rear surface of the signature piece 10, which can include areas for the user to record information. A line 20 may be present for recording the name of the individual who signed the piece; a line 22 may be present for recording the location where the piece was signed; and a line 24 may be present for recording the time when the piece was signed. An additional space 26 may be included where the user may record any additional information related to the signing or the event at which the signing took place. This area 26 may be used to record a sequential number or recorded number when the piece is registered with a central library or database. The piece may be of a size from two to six inches. The piece may be the actual size of the item shown on the piece, such as a basketball of approximately twelve inches in diameter.

Figure 3:
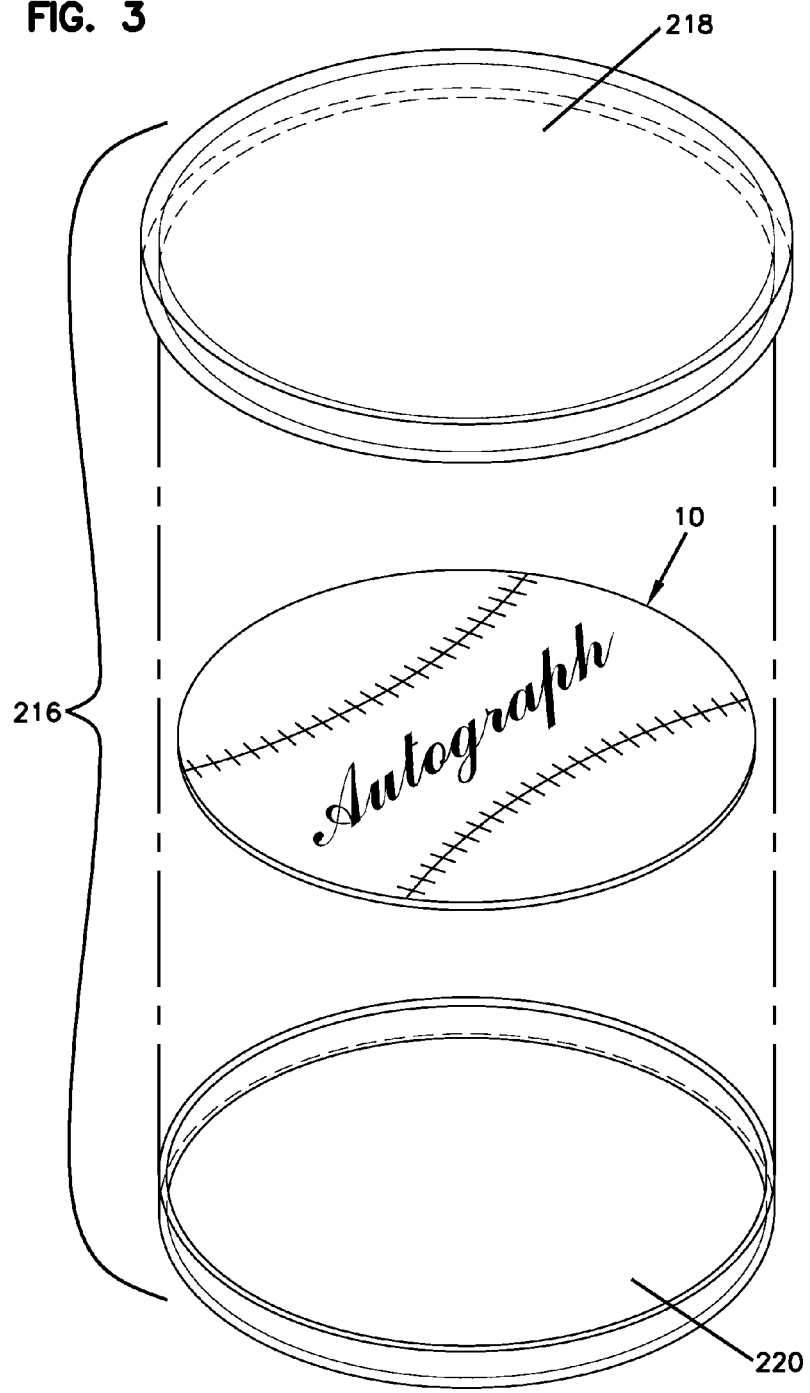
FIG. 3 is an exploded view of the plaquette of FIGS. 1 and 2 shown in combination with a two-piece storage and display case configured for receiving the plaquette.

FIG. 3 shows an example of a container used for the holding and storage of the signature piece 10. The piece 10 may be stored and displayed in this container. In this example, the container may be of a clear, plastic, round part made of a copolymer or pliable plastic material. The container is made of two similar sized parts, which may be held together through a hinged mechanism (not shown) or friction fit to hold the parts tightly together. The preferred container would be held together through a friction fit.

Figure 6:
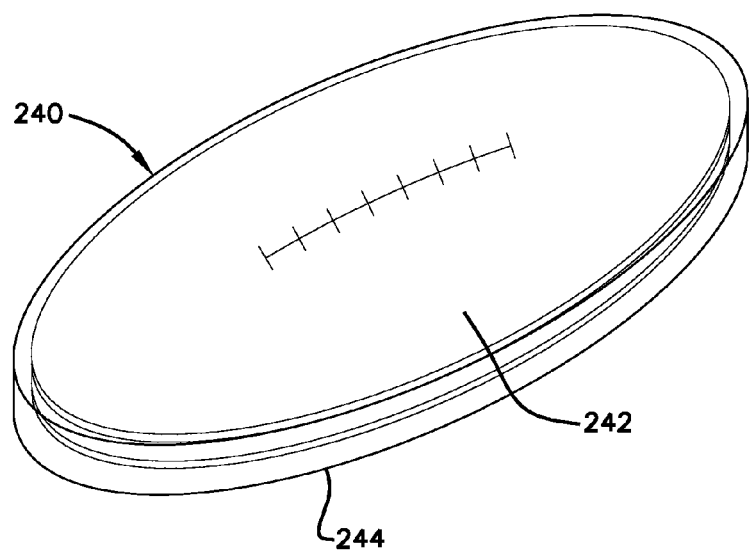
FIG. 6 is a perspective view illustrating another plaquette display case in accordance with the principles of the present disclosure; the display case is generally American football-shaped.

FIG. 6 shows an example of another example container. The container of FIG. 6 has the shape of an American football or English rugby ball. It includes a top portion and bottom portion.

Figure 8:
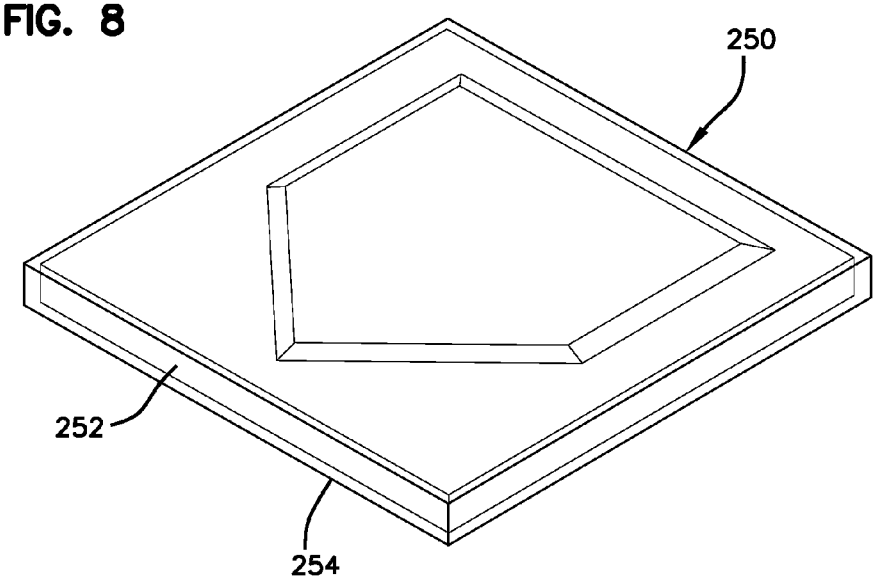
FIG. 8 is a perspective view of another plaquette storage and display case in accordance with the principles of the present disclosure.

FIGS. 8 and 9 show a container having a square configuration that includes a top portion and bottom portion. This shape may be used to hold oddly shaped pieces which would fit in this container, such as a baseball home plate, a star, a baseball glove, and others.

Figure 10A:
FIG. 10A is a front, plan view of a plaquette in accordance with the principles of the present disclosure that depicts a musical note so as to have a characteristic indicative of the music industry.
Figure 10B:
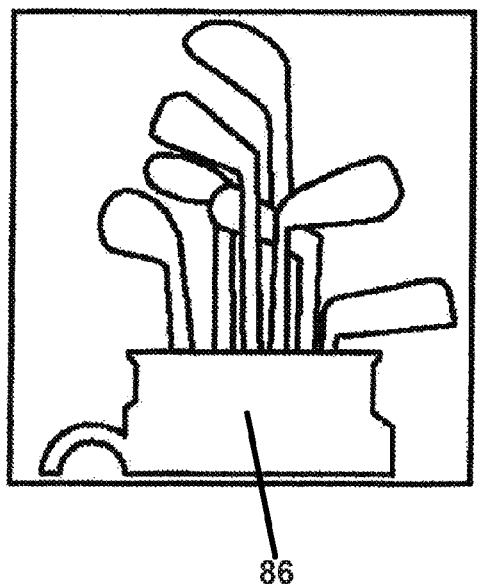
FIG. 10B is a front, plan view of a plaquette in accordance with the principles of the present disclosure that depicts golf clubs so as to have a characteristic indicative of the sports industry.
Figure 10C:
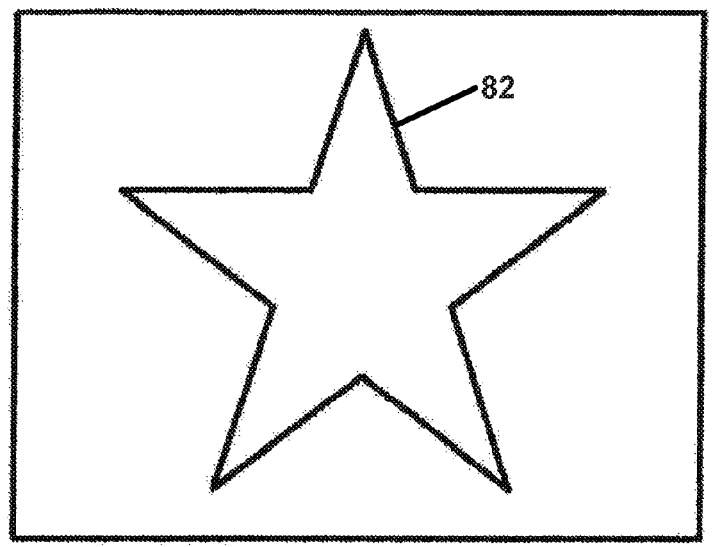
FIG. 10C is a front, plan view of a plaquette in accordance with the principles of the present disclosure that depicts a star so as to have a characteristic that is indicative of the entertainment industry.
Figure 10D:
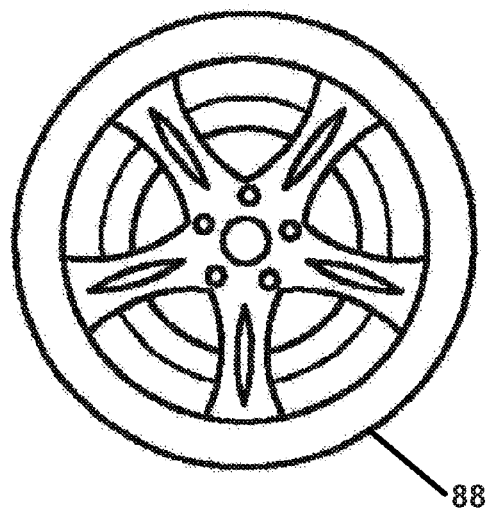
FIG. 10D is a front, plan view of a plaquette in accordance with the principles of the present disclosure that emulates a wheel so as to be indicative of the racing/sports industry.
Figure 10F:
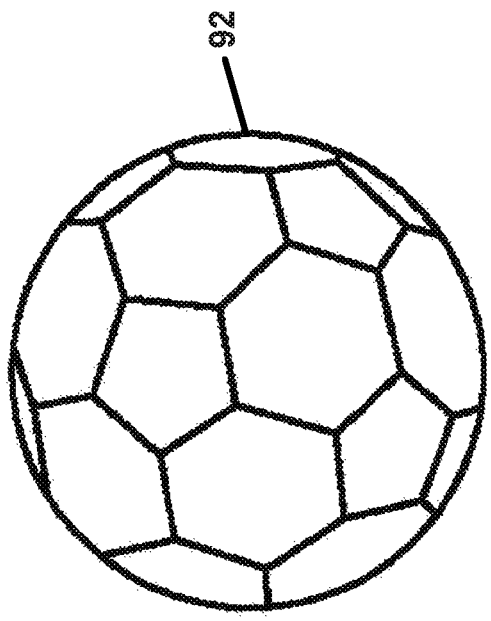
FIG. 10F is a front, plan view of a plaquette in accordance with the principles of the present disclosure that emulates a soccer ball so as to have a characteristic that is indicative of the sports industry.
Figure 10E:
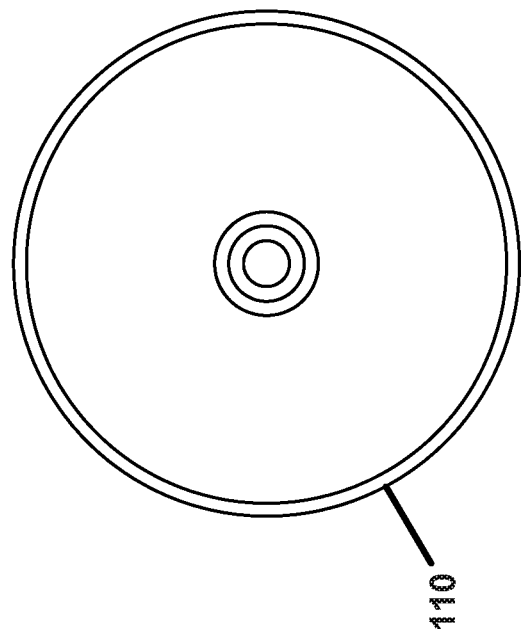
FIG. 10E is a front, plan view of a plaquette in accordance with the principles of the present disclosure that emulates a compact disc or album so as to have a characteristic that is indicative of the music industry.
Figure 10H:
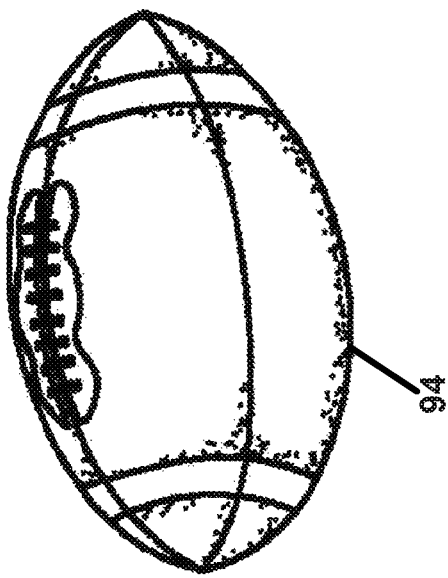
FIG. 10H is a front, plan view of a plaquette in accordance with the principles of the present disclosure that emulates a steering wheel so as to have a characteristic that is indicative of the racing/sports industry.
Figure 10G:
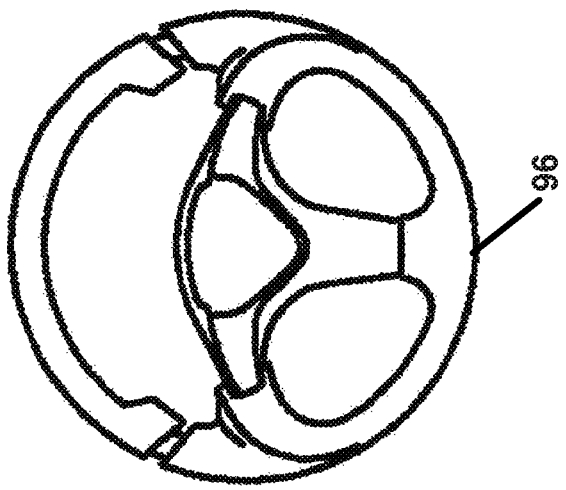
FIG. 10G is a front, plan view of a plaquette in accordance with the principles of the present disclosure that emulates an American football so as to have a characteristic that is indicative of the sports industry.
Figure 10J:
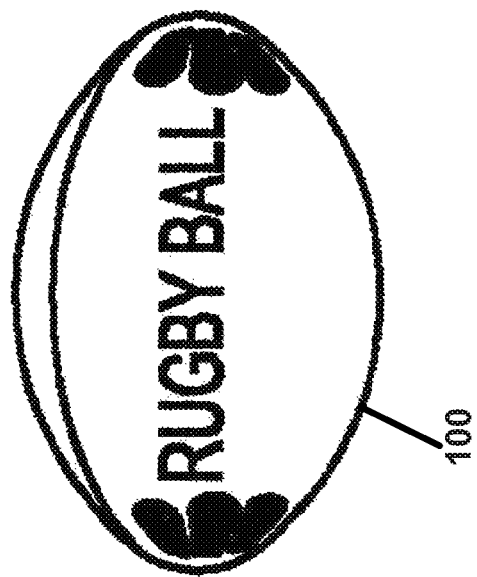
FIG. 10J is a front, plan view of a plaquette in accordance with the principles of the present disclosure, the plaquette emulates a rugby ball so as to have a characteristic that is indicative of the sports industry.
Figure 10I:
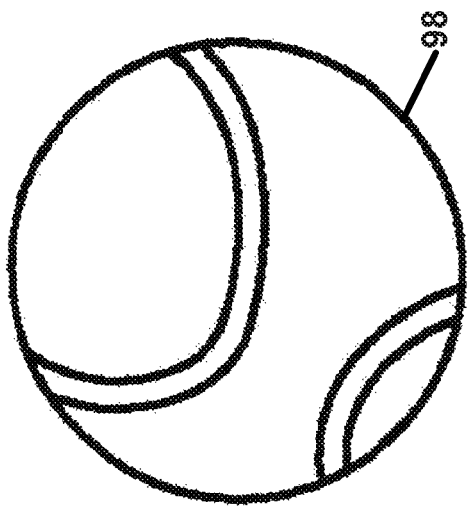
FIG. 10I is a front, plan view of a plaquette in accordance with the principles of the present disclosure that emulates a tennis ball so as to have a characteristic that is indicative of the sports industry.
Figure 10K:
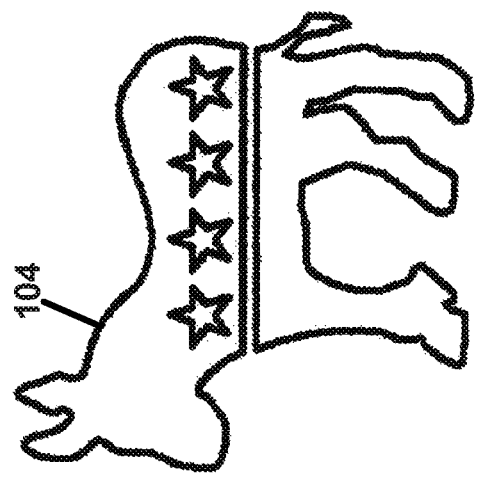
FIG. 10K is a front, plan view of a plaquette in accordance with the principles of the present disclosure that depicts an elephant so as to have a characteristic that is indicative of the politics industry.
Figure 10L:
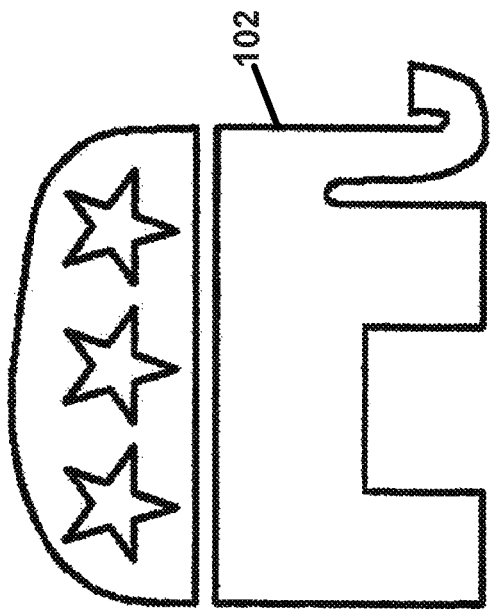
FIG. 10L is a front, plan view of a plaquette in accordance with the principles of the present disclosure that depicts a donkey so as to have a characteristic that is indicative of the politics industry.
Figure 10M:
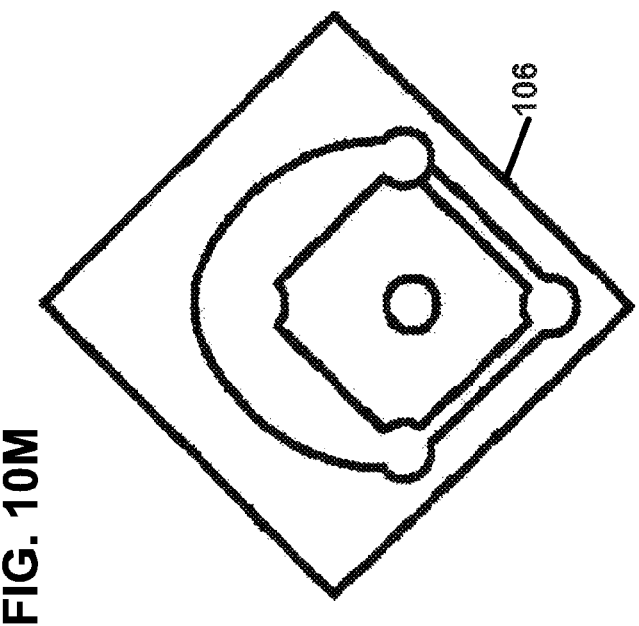
FIG. 10M is a front, plan view of a plaquette in accordance with the principles of the present disclosure that depicts a baseball diamond so as to have a characteristic that is indicative of the sports industry.
Figure 10N:
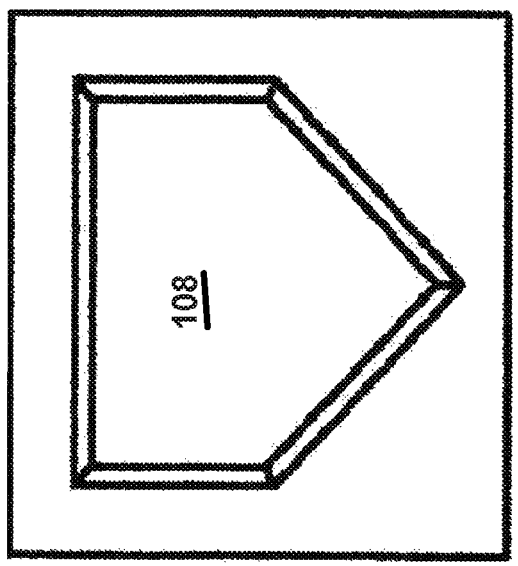
FIG. 10N is a front, plan view of a plaquette in accordance with the principles of the present disclosure that depicts a baseball home plate so as to have a characteristic that is indicative of the sports industry.
Figure 10O:
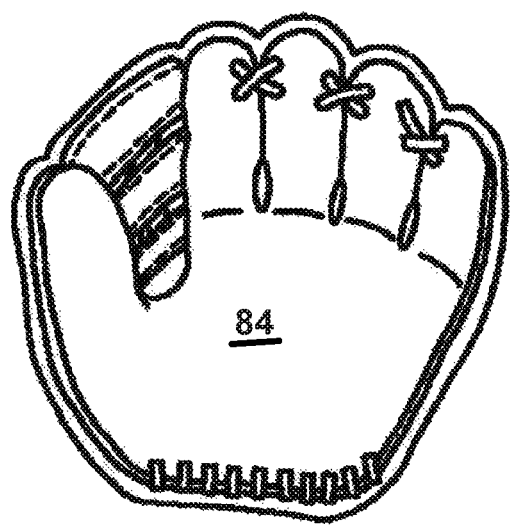
FIG. 10O is a front, perspective view of a plaquette in accordance with the principles of the present disclosure that emulates a baseball glove so as to have a characteristic that is indicative of the sports industry.

FIGS. 10A-10O show examples of various images and shapes the signature piece can take. These are non-limiting examples of signature pieces. The example images include: a musical note 80 (FIG. 10A); a set of golf clubs 86 (FIG. 10B); a star 82 (FIG. 10C); a wheel 88 (FIG. 10D); a compact disc or album 110 (FIG. 10E); a soccer ball 92 (FIG. 10F); an American football 94 (FIG. 10G); a steering wheel 96 (FIG. 10H); a tennis ball 98 (FIG. 10I); a rugby ball 100 (FIG. 10J); an elephant 102 (FIG. 10K); a donkey 104 (FIG. 10L); a baseball diamond 106 (FIG. 10M); and a baseball home plate 108 (FIG. 10N); and a baseball glove 84 (FIG. 10O). Additional embodiments of the signature pieces are contemplated.

Additional example images and shapes (not shown) for signature pieces include a basketball, a hockey puck, a volleyball, a cricket ball, a badminton fly/shuttlecock, boxing gloves, boxing shorts, a race car, a bowling ball, a book, a motorcycle, an automobile, a woman, a man, a bicycle, a shoe, cleats, a sneaker, a high heel shoe, a guitar, jerseys associated various sports, a head, a flag, a football helmet, a baseball hat, a TV set, a tennis racket, a camera, and a trophy.

Referring back to FIGS. 1 and 2, the baseball piece 10 is an example of a collectable item for acquiring and displaying an autograph in accordance with the principles of the present disclosure. The baseball piece 10 is a plaquette that has a flat construction defining a minor thickness T (see FIG. 5) that extends between a major front side 200 (see FIG. 1) and an opposite major back side 202 (see FIG. 2). As shown at FIGS. 1 and 2, the baseball piece 10 has a round planform. The major front side 200 of the plaquette includes a front surface 204 suitable for receiving an autograph thereon. The front surface 204 can have a texture that emulates baseball leather. The major front side 200 also can have raised baseball stitches 206 that feel like baseball stitches to the touch. The major back side 202 of the baseball piece 10 can include a rear surface 208 defining an area for recording autograph information. In certain examples, the rear surface 208 can have a texture that emulates baseball leather and may or may not include baseball stitches.

It will be appreciated that the thickness T is a minor thickness because it is substantially smaller than cross dimensions defined by the major front and back sides 200, 202. In certain examples, the cross dimensions of the front and back sides 200, 202 are at least 10, 20, 30 or 40 times as large as the dimension defined by the minor thickness T. In certain examples, the minor thickness T is generally uniformly defined between the major front and back sides 200, 202. As used herein, the term "flat construction" means that the plaquette is flat in a "macro" sense not taking into consideration relatively minor variations in thickness corresponding to structures, such as surface texturing, stitches, or other like structures.

Figure 5:
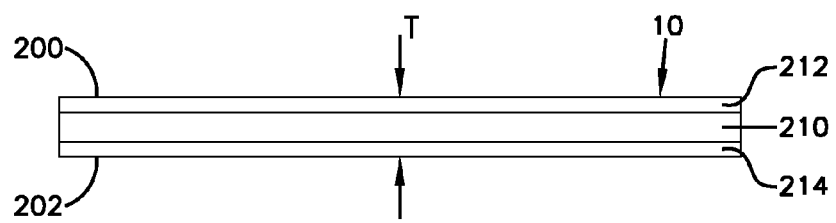
FIG. 5 is a schematic, cross-sectional view taken along section line 5-5 of FIG. 1.

Referring to FIG. 5, plaquettes in accordance with the principles of the present disclosure, such as the baseball piece 10, can have a laminated construction including one or more stiffening layers 210 positioned between outer front and back aesthetic layers 212, 214. The one or more stiffening layers 210 and the aesthetic layers 212, 214 can be adhesively bonded or otherwise joined together. In certain examples, the aesthetic layers 212, 214 can include textured surfaces that emulate or mimic the feel of the article being emulated. For example, in certain examples, the layers 212, 214 can emulate the feel of leather, stitches, or other aspects of the article being emulated. In other examples, the aesthetic layers 212, 214 can be photographic images, artistic renderings, three-dimensional images, three-dimensional photographs, or other images indicative of the article being emulated. In other examples, the back aesthetic layer 214 can be eliminated and is, therefore, optional.

In certain examples, plaquettes in accordance with the principles of the present disclosure are relatively nonpliant. For example, to facilitate receiving an autograph, plaquettes in accordance with the principles of the present disclosure can be self-supporting when being signed. In this way, plaquettes in accordance with the principles of the present disclosure can be signed without requiring supplemental backing support while the individual autographing the plaquettes grasps the edges of the plaquettes. In certain examples, plaquettes in accordance with the principles of the present disclosure are at least twice as stiff as a conventional Tops brand baseball card.

As described above, certain plaquettes in accordance with the principles of the present disclosure have thicknesses that are substantially smaller than the cross dimensions of their corresponding major front and back sides. In certain examples, plaquettes in accordance with the principles of the present disclosure can have thicknesses T in the range of $1\frac{1}{16}^{th}$ inch to $\frac{1}{2}$ inch or in the range of $\frac{1}{8}^{th}$ inch to $\frac{3}{8}^{th}$ inch, or in the range of $\frac{1}{8}^{th}$ inch to $\frac{1}{4}$ inch. In certain examples, plaquettes in accordance with the principles of the present disclosure can have thicknesses T greater than $\frac{1}{16}^{th}$ inch or greater than $\frac{1}{8}^{th}$ inch.

In certain examples, plaquettes in accordance with the principles of the present disclosure can be pocket-sized. In certain examples, plaquettes in accordance with the principles of the present disclosure can have front surface areas less than 144 square inches, or less than 64 square inches, or less than 36 square inches, or less than 16 square inches, or less than 9 square inches. In certain examples, plaquettes in accordance with the principles of the present disclosure can have front surface areas in the range of 4 square inches to 64 square inches, 4 square inches to 16 square inches, or 4 square inches to 9 square inches. In certain examples, plaquettes in accordance with the principles of the present disclosure can have front sides having cross dimensions in the range of 2 to 12 inches, 2 to 8 inches, 2 to 6 inches, or 2 to 4 inches.

In certain examples, collectable items in accordance with the principles of the present disclosure can include an autographable plaquette in combination with a display case for receiving and protecting the plaquette. In certain examples, the display case can be flat, rigid, and transparent. In certain examples, the display case can be made of a material that includes transparent plastic. In certain examples, the display case can have a planform that conforms to the planform of the plaquette received therein. In certain examples, the display case includes mating front and back pieces between which the plaquette is received. In certain examples, the display case includes an ultraviolet protectorate (e.g., a UV absorber or inhibitor) that prevents the plaquette or an autograph thereon from degrading by exposure to ultraviolet radiation. In certain examples, the display case is pocket-sized. In certain examples, the display case is more rigid than the plaquette. In certain examples, the display case has a construction sufficiently rigid such that the display case will crack or otherwise become permanently damaged if bent 90°.

Referring to FIG. 3, an example plastic display case 216 for the baseball piece 10 is depicted. The display case 216 includes front and back transparent pieces 218, 220 between which the baseball piece 10 is received. In certain examples, the front and back pieces 218, 220 are configured to mate together and can be held together by a friction fit. As shown at FIG. 3, the display case 216 has a round planform that conforms to the round planform of the baseball piece 10. The display case 216 can be air-tight.

Figure 4:
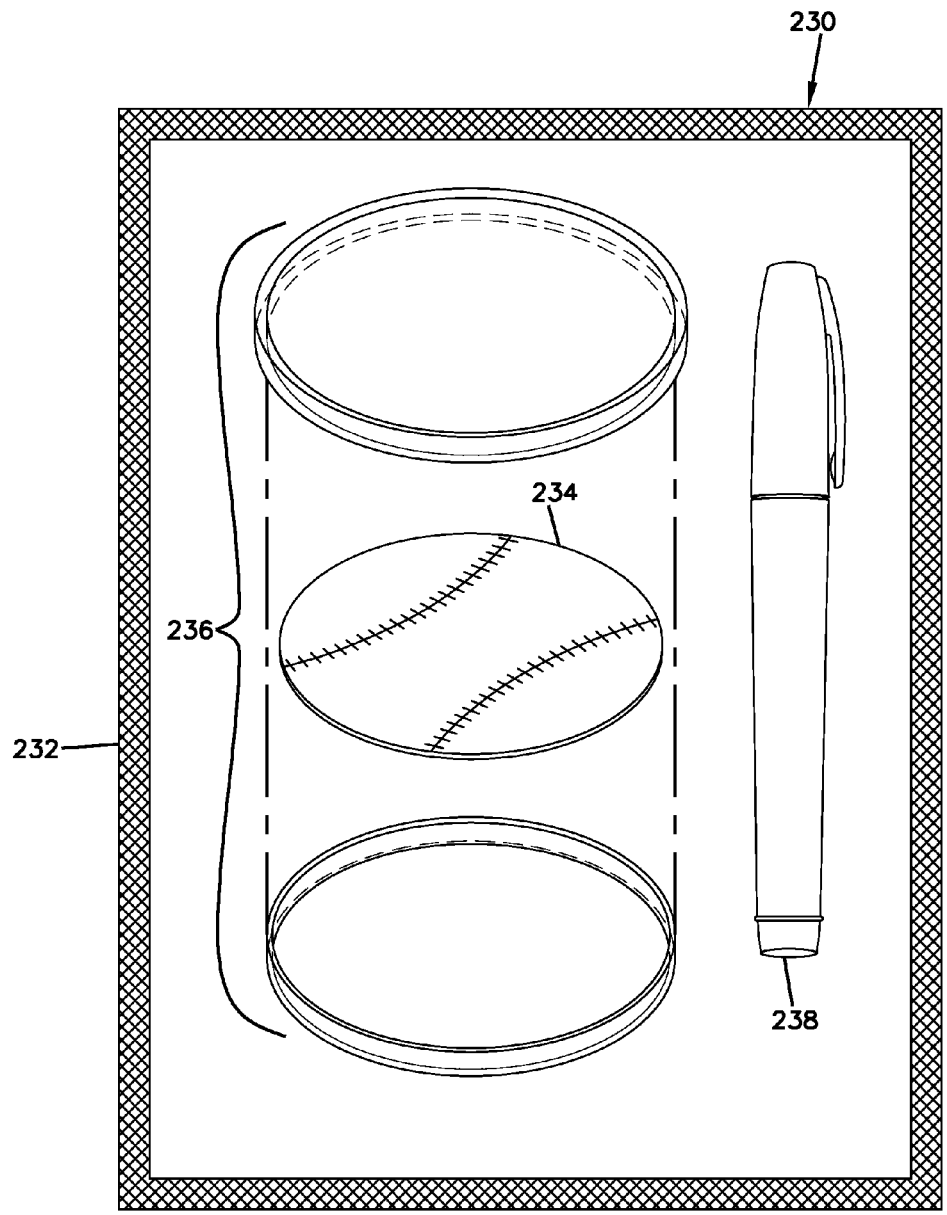
FIG. 4 illustrates a kit in accordance with the principles of the present disclosure; the kit includes packaging that contains the plaquette and case of FIG. 3 in combination with a writing instrument such as a pen suitable for use in writing an autograph on the front side of the plaquette.

FIG. 4 illustrates a kit 230 in accordance with the principles of the present disclosure. The kit 230 includes packaging 232 containing a plaquette 234 of the type described herein, a plastic plaquette display case 236 of the type described herein, and a pen 238 suitable for use in writing an autograph on the plaquette 234. In certain examples, the packaging 232 can include a bubble-wrap packaging configuration including a cardboard backing and a plastic layer that is attached to the cardboard backing and that secures the plaquette 234, the plastic plaquette display case 236, and the pen 238 to the cardboard backing. In certain examples, advertising can be provided on the packaging. Also, instructions for using the kit 230 can be provided in the packaging. In certain examples, the instructions can describe a process for using the kit 230.

In use, the plaquette 234 can initially be stored in the plastic plaquette display case 236 prior to obtaining an autograph. While the plaquette 234 is stored in the plastic plaquette display case 236, the plaquette 234 can easily be carried in a person's pocket, purse, handbag, backpack, briefcase, glove box, or other location. When a celebrity is encountered, the plaquette 234 can be removed from the plastic plaquette display case 236 to allow the celebrity to sign an autograph on a front side of the plaquette 234. Information regarding the autograph (e.g., the date and time, location of the signing, name of the person signing the autograph, etc.) can be recorded on the back of the plaquette 234. Separate lines on the back of the plaquette can be provided for each entry. Thereafter, the autographed plaquette 234 can be placed back in the plastic plaquette display case 236 to protect the autograph from smearing or other damage. Thus, prior to obtaining the autograph, the plaquette 234 is effectively protected by the plastic display case 236 such that the plaquette 234 maintains an appealing aesthetic appearance. Similarly, once the autograph has been obtained, the plaquette 234 can be returned to the plastic display case 236 such that the autograph is not smeared or damaged and the plaquette 234 itself is not damaged (e.g., folded, bent, frayed, or otherwise damaged). Thereafter, the plastic display base 236 allows the plaquette 234 to be readily displayed. For example, the plaquette 234 within the plastic display case 236 can be mounted to a wall, displayed on a shelf, mounted in a rack, mounted in a display, or otherwise placed in a location for ready viewing.

Figure 7:
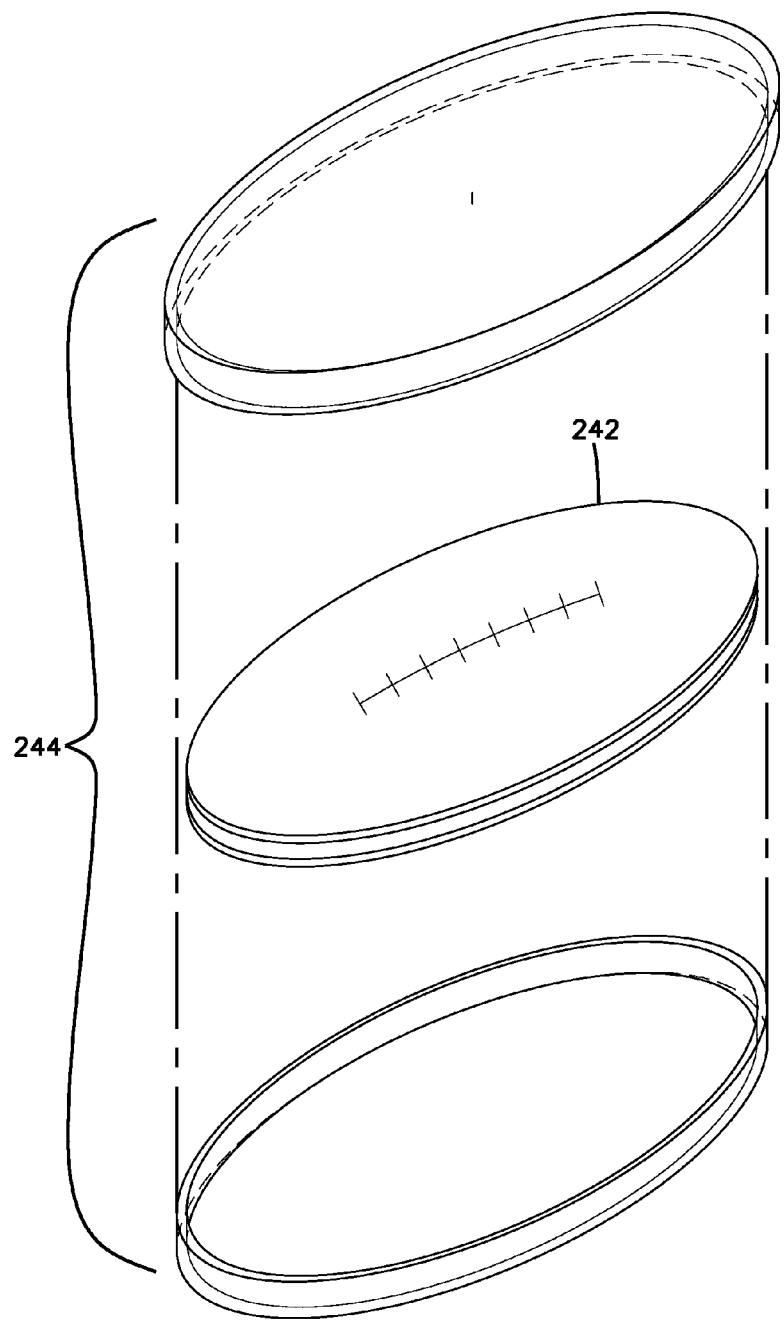
FIG. 7 is an exploded view showing the storage and display case of FIG. 6 in combination with a plaquette that is configured and shaped so as to mimic/emulate an American football.

FIGS. 6 and 7 illustrate another collectable item 240 in accordance with the principles of the present disclosure. The collectable item includes a plaquette 242 that is obround and that is configured to emulate a football. The plaquette 242 can have a minor thickness that extends between a major front side and an opposite major back side. In certain examples, the plaquette 242 can have a flat construction. In certain examples, the front and back sides can have a texture that emulates the look and feel of football leather. In certain examples, the major front side can include raised laces that have the touch and feel of football laces. In certain examples, the plaquette 242 can have a laminated construction with at least one stiffening layer positioned between front and back aesthetic layers. In other examples, only a front aesthetic layer is attached to the stiffening layer and the back aesthetic layer is eliminated. The collectable item 240 also includes a pocket-sized display case 244 for receiving and protecting the plaquette 242. The display case 244 can have a flat, rigid construction and can be transparent. As shown at FIGS. 6 and 7, the display case 244 has a shape that conforms to a corresponding shape of the plaquette 242.

FIGS. 8 and 9 illustrate another collectable item 250 in accordance with the principles of the present disclosure. The collectable item 250 includes a plaquette 252 that emulates a baseball home-plate. In certain examples, the plaquette 252 can have a minor thickness that extends between major front and back sides. In certain examples, the plaquette 252 can have a laminated construction with a stiffening layer positioned between front and rear aesthetic layers. In certain examples, only a front aesthetic layer is provided. In certain examples, at least the front side of the plaquette 252 has a look and feel that emulates the rubber of a convention baseball home-plate. The collectable item 250 also includes a plastic display case 254. In the depicted example, the display case 254 is flat and has a planform that conforms to the planform of the plaquette 252. The display case 254 can be transparent and can have a rigid construction suitable for protecting the plaquette 252 from bending, folding, or other damage. In certain examples, the display case 254 is pocket-sized.

Another aspect of the present disclosure relates to a method for promoting the acquisition of autographs. The method can include making available a line of pocket-sized plaquettes each defining a minor thickness that extends between a major front side and an opposite major back side. The plaquettes can have flat constructions and can include characteristics that are indicative of one or more industries that include celebrities. The major front sides of the plaquettes can include front surfaces suitable for receiving autographs thereon. The method also includes marketing the plaquettes as autographable items. It will be appreciated that the phrase "making available a line of pocket-sized plaquettes" includes activities such as making plaquettes, storing plaquettes, distributing plaquettes, and/or shipping plaquettes. It will be appreciated that the phrase "marketing the plaquettes as autographable items" includes activities such as offering for sale autographable plaquettes on the internet, offering for sale autographable plaquettes on television, offering for sale autographable plaquettes via written media (e.g., newspapers or magazines), and offering autographable plaquettes as giveaways or promotional items at sporting events, conventions, grand openings, shows, or other events where celebrities are likely to be present. It will be appreciated that the line of pocket-sized plaquettes can include any of the plaquettes described herein as well as other plaquettes.

Other aspects of the present disclosure relate to systems and series of memorabilia plaquettes, which can be readily autographed, signed, registered, collected, and displayed. The series of plaquettes can include many different shapes and sizes and can include images or other indicia related to sport, profession, or other pastime. The plaquettes can be related to a section of a collectable population, such as sports, music, acting, politics, auto racing, and more. The plaquettes can be made of markable material and can have areas for recording an autograph or signature, and an information area such as on the front or back of the plaquettes. In certain examples, a user can obtain an autograph on the front of the plaquette and then record certain pertinent information about the signed autograph, such as the person who signed it, the time, the date, the location of the signature, and other information. In certain examples, the plaquettes can be serialized after being autographed to allow for recording and identification. The serialization can be used to establish a group of autographs or to assist in establishing the identity of the person signing the autograph, as well as the original time and place at which the autograph was signed. In certain examples, the autograph plaquettes may be registered in a central recoding archive, through a registry, which may include images of the plaquettes, sequencing, and such. In certain examples, sequential or recorded numbers may be placed on the rear sides of the plaquettes to assist in registering the plaquettes in a central library, archive, gallery, or database on a website or such. In this way, the recorded numbers assist in organizing the plaquettes and facilitate identifying, locating, and recording/verifying the authenticity of these autographed plaquettes. In certain examples, the archive system may allow a person obtaining an autograph on a plaquette to record the plaquette image and information in the central archive along with an image/photo of the person signing the autograph at the moment they actually are autographing the plaquette. Thus, the archive can allow individuals (e.g., customers who purchase the plaquettes) to record their autographed plaquettes in a central archive to assist in verifying the authenticity of the autograph and in establishing a point-in-time at which the plaquette was autographed. The central archive can be searchable and can provide a means for allowing autographed plaquettes to be offered for sale or displayed. Access to the database (e.g., for recording autographed items, for selling autographed items, and/or for viewing or purchasing autographed items) can be obtained as a benefit associated with the purchase of a plaquette or can be separately purchased. The registered autographed items can be separated into groups within the registry database based on factors such as when the items were autographed, where the items were autographed, and/or the industry/field to which the autographed items relate. The registry can be accessed through a website which allows the items to be sold, tracked, or bartered. In certain examples, the autographed plaquettes can be made available for sale as collectable items and can be marketed as collectable items suitable for collecting and displaying.

Since many changes and variations of the disclosed embodiments of the invention may be made without departing from the inventive concept, it is not intended to limit the invention otherwise than as required by the appended claims.

What is claimed is:

1. A collectible item for acquiring and displaying an autograph, the collectible item comprising:

a plaquette having a laminated bonded construction without through holes, the plaquette defining a minor thickness that extends between a major front side, a stiffening layer, and an opposite major back side, wherein the minor thickness is ⅛ inch to ¼ in magnitude, and wherein the major front side and major back side are bonded to the stiffening layer;

the plaquette having a round planform;

the major front side of the plaquette including a front surface suitable for receiving an autograph thereon, the front surface having a textured portion that emulates baseball leather, wherein the front surface is configured to receive the autograph on the textured portion the major front side having raised baseball stitches that feel like baseball stiches to the touch;

the major back side including a rear surface defining an area for recording autograph information, wherein the rear surface includes at least one line for recording the autograph information; and a plastic display case for receiving and protecting the plaquette, the display case being flat, rigid, and transparent, wherein the plastic display case has a round planform that conforms to the round planform of the plaquette, wherein the plastic display case includes mating front and back pieces between which the plaquette is received, wherein the plastic display case has a thickness substantially similar to the minor thickness of the plaquette, and wherein the plastic display case includes a UV protectorate.

2. The collectible item of claim 1, wherein the plaquette has a diameter of 2-6 inches.

3. The collectible item of claim 1, wherein the rear surface includes multiple parallel lines for recording the autograph information.

4. The collectible item of claim 1, wherein the plastic display case has a diameter of 2-6 inches.

5. The collectible item of claim 1, wherein the plaquette is nonpliant.

6. The collectible item of claim 1, further comprising a kit including packaging that contains the plaquette and the display case, the kit also including a set of instructions, wherein the instructions instruct a user to:

carry the plaquette in the display case;
remove the plaquette from the display case;
present the plaquette to a person whose autograph is sought;
receive autograph on the textured portion of the front surface of the plaquette; and
replace the plaquette back into the display case.

7. The collectible item of claim 6, wherein the kit also includes a pen contained in the packaging.

8. The collectible item of claim 1, wherein the major front side and major back side are bonded with the stiffening layer by way of an adhesive.

9. A method for promoting the acquisition of autographs, the method comprising:

making available a line of round plaquettes each defining a minor thickness that extends between a major front side, a stiffening layer, and an opposite major back side, the plaquettes each having a laminated bonded construction without through holes, the major front side and major back side of each plaquette being bonded to the stiffening layer, the major front side of each plaquette including a front surface suitable for receiving an autograph thereon, the front surface having a textured portion that emulates baseball leather, wherein the front surface is configured to receive the autograph on the textured portion, the major front side having raised baseball stitches that feel like baseball stitches to the touch, the major back side including a rear surface defining an area for recording autograph information, wherein the rear surface of each plaquette includes at least one line for recording the autograph information and wherein each plaquette includes a unique identifier;

marketing the plaquettes as autographable items;

marketing the plaquettes in combination with rigid, plastic display cases for receiving the plaquettes, the display case being flat, rigid, and transparent, wherein the plastic display case has a round planform that conforms to the round planform of the plaquette; and providing a registry in which the unique identifier of each plaquette can be registered, the registry being configured to assist in determining the authenticity of autographed plaquettes.

10. A method for using the collectible item of claim 1 comprising:

carrying the plaquette in the plastic case;
removing the plaquette from the plastic case;
presenting the plaquette to a person whose autograph is sought;
receiving an autograph on the textured portion of the front surface of the plaquette;
recording autograph information on the rear surface of the plaquette; and
replacing the plaquette back into the plastic case.

* * * * *